United States Patent
Tamura et al.

[11] Patent Number: 5,861,577
[45] Date of Patent: Jan. 19, 1999

[54] SEAL STRUCTURE FOR MEMBER-PASSING-THROUGH HOLE BORED IN METAL PARTITION MEMBER

[75] Inventors: Morio Tamura, Tsuchiura; Ken Ichiryu, Ibaraki-Ken; Kiyoshi Tanaka, Mitsukaidou; Kouji Harada, Katsuta; Hisanobu Kanamaru, Katsuta; Nobuyuki Tobita, Mito, all of Japan

[73] Assignees: Hitachi Construction Machinery Co., Ltd.; Hitachi, Ltd., both of Tokyo, Japan

[21] Appl. No.: 946,097

[22] Filed: Oct. 7, 1997

Related U.S. Application Data

[63] Continuation of Ser. No. 190,177, filed as PCT/JP93/00746 Jun. 3, 1993 published as WO93/25829 Dec. 23, 1993, abandoned.

[30] Foreign Application Priority Data

Jun. 5, 1992 [JP] Japan .................................. 4-171700

[51] Int. Cl.⁶ ...................................................... H01J 5/32
[52] U.S. Cl. .................................. 174/50.56; 174/65.55; 174/65 G; 29/451; 29/520; 285/382
[58] Field of Search ............................... 174/50.56, 65 R, 174/65 SS, 65 G, 50.58, 50.6, 151, 152 R, 153 R, 152 G, 153 G; 248/56; 29/520, 451; 285/382, 162, 196, 338; 16/2.1, 2.2

[56] References Cited

U.S. PATENT DOCUMENTS

| | | | |
|---|---|---|---|
| 1,697,814 | 1/1929 | Forbes | 174/152 G X |
| 2,071,597 | 2/1937 | Vasselli | 250/27.5 |
| 2,223,153 | 11/1940 | Seifer | 174/152 G X |
| 2,225,472 | 12/1940 | Franklin | 174/153 G X |
| 2,459,370 | 1/1949 | Ferguson et al. | 174/152 G X |
| 2,577,576 | 12/1951 | Glickman et al. | 174/50.58 X |
| 3,322,890 | 5/1967 | Kennedy et al. | 174/65 R X |
| 4,102,030 | 7/1978 | King, Jr. | 29/451 X |
| 4,262,913 | 4/1981 | Parfree et al. | 174/65 SS X |
| 4,266,683 | 5/1981 | Sellinger | 174/65 G X |
| 4,267,401 | 5/1981 | Wilkinson | 174/65 SS X |
| 4,301,325 | 11/1981 | Hutchison | 174/65 SS X |
| 4,427,842 | 1/1984 | Anderson | 174/77 R |
| 5,083,362 | 1/1992 | Edgar et al. | 29/509 |
| 5,090,644 | 2/1992 | Lenker | 174/153 G X |
| 5,156,032 | 10/1992 | Edgar | 29/451 X |
| 5,170,017 | 12/1992 | Stanevich et al. | 174/152 G X |
| 5,235,138 | 8/1993 | Shah et al. | 174/152 G X |
| 5,442,140 | 8/1995 | McGrane | 174/151 |

FOREIGN PATENT DOCUMENTS

| | | | |
|---|---|---|---|
| 278544 | 8/1988 | European Pat. Off. | 174/65 G X |
| 249575 | 9/1987 | Germany | 174/65 R X |
| 58-116862 | 8/1983 | Japan . | |
| 60-240339 | 11/1985 | Japan . | |
| 63-18806 | 5/1988 | Japan . | |
| 63-214429 | 9/1988 | Japan . | |
| 63-214430 | 9/1988 | Japan . | |
| 63-224822 | 9/1988 | Japan . | |

*Primary Examiner*—Dean A. Reichard
*Attorney, Agent, or Firm*—Fay, Sharpe, Beall, Fagan, Minnich & McKee

[57] ABSTRACT

A seal structure in which a hole (5) is defined by a metal base member (4) as a partition member for partitioning the regions on the opposite sides thereof to a gas tight or liquid tight state and a member passes through the hole (5) and extends therefrom. The member passing through the hole (5) may be an electric conductor (2), a pipe member for flowing gas or liquid, a heat pipe for flowing a heat medium, an optical fiber for transferring an optical signal, or the like, and the structure is arranged such that the member passing through the hole is disposed through a synthetic resin seal member (3) and the hole (5) is sealed based on the confinement effected by the plastic deforming action of the base member (4) and the deforming action of the seal member (3) effected by making use of the elastic plasticity thereof, whereby the structure exhibits an excellent pressure resistive performance and can effectively seal the hole (5).

40 Claims, 14 Drawing Sheets

RELATIONSHIP BETWEEN THE COMPRESSING FORCE OF PRESSURE APPLICATION METAL FITTING AND THE EXTRACTING FORCE OF CONDUCTOR

| COMPRESSING FORCE | EXTRACTING FORCE | |
|---|---|---|
| | INSULATOR A (PPS) | INSULATOR B (PEEK) |
| 300 Kgf | 12 Kgf | 9 Kgf |
| 400 Kgf | 14 Kgf | 10 Kgf |
| 500 Kgf | 16 Kgf | 12 Kgf |
| 600 Kgf | | 12 Kgf |

OUTLINE OF TEST PIECE

FIG.6

RESULT OF IMPULSE TEST

| SYNTHETIC RESIN METERIAL | COMPRESSING FORCE | RESULT OF TEST |
|---|---|---|
| PPS | 300 Kgf | OK |
| | 400 Kgf | OK |
| | 500 Kgf | OK |
| PEEK | 300 Kgf | OK |
| | 400 Kgf | OK |
| | 500 Kgf | OK |
| | 600 Kgf | OK |

FIG.9

RELATIONSHIP BETWEEN TEMPERATURE AND EXTRACTING FORCE

| TEMPERATURE | EXTRACTING FORCE |
|---|---|
| −40 °C | ABT. 14 Kgf |
| 23 °C | ABT. 12 Kgf |
| 80 °C | ABT. 8 Kgf |
| 120 °C | ABT. 7 Kgf |

SEAL STRUCTURE FOR MEMBER-PASSING-THROUGH HOLE BORED IN METAL PARTITION MEMBER

This is a continuation application of Ser. No. 08/190,177, filed as PCT/JP93/00746 Dec. 3, 1993 published as WO93/25829 Dec. 23, 1993, now abandoned.

TECHNICAL FIELD

The present invention relates to a seal structure for a member-passing-through hole bored or formed in a metal partition member, and more specifically, to a structure for sealing a hole bored or formed in a metal partition member, which isolates the inside region thereof from the outside, such as, for example, a pressure vessel, vacuum vessel and closed vessel for accommodating gas and liquid which has a member such as, for example, a conductor or conductor pin for transferring an electric signal or power, other conducting material, metal pipe member for flowing fluid, heat pipe for flowing a heat medium, optical fiber for transferring an optical signal, and the like each passing through the hole so that the hole has an excellent pressure resistive performance against high pressure and can be stably sealed for a long time to thereby fix the member.

BACKGROUND ART

A hydraulic machine such as, for example, a hydraulic shovel and the like has, for example, a pressure sensor, pressure difference sensor, displacement sensor and the like disposed in the respective sections of the hydraulic fluid contained in a hydraulic drive unit for operating the machine to check the operating state of the hydraulic drive unit so that the pressure state and the like in the unit can be measured. The circumstance in which the pressure sensor and the like are disposed is the high pressure circumference in the hydraulic fluid contained in the unit. For example, the pressure sensor is usually arranged as an electric unit including a Wheatstone bridge circuit making use of strain gauges and the like. A hydraulic pressure as an object to be sensed is converted into an amount of electricity by the pressure sensor and sensed as an electric signal. The electric signal produced by the pressure sensor is derived from the high pressure interior of the unit to the outside thereof at an atmosphere pressure through a signal deriving line. A control unit is disposed outside the hydraulic drive unit to control the operation thereof and the thus sensed signal derived to the outside through the signal deriving line is input to the control unit and used for various controls effected thereafter as an information regarding the operating state.

In the above arrangement, a conventional typical arrangement for extracting the signal deriving line to the outside is such that, for example, a hole is bored in a portion of the metal vessel of the unit to cause the signal deriving line to pass therethrough and further the signal deriving line is fixed within the hole by the application of a hermetic seal structure to thereby seal hydraulic fluid as well as maintain electric insulation between the signal deriving line and the metal vessel. There has been conventionally a glass hermetic seal and plastic hermetic seal as such a hermetic seal.

The glass hermetic seal used in the conventional seal structure of the signal line deriving portion must be processed at a high temperature of about 1000° C. in an $N_2$ atmosphere by using a furnace. Therefore, a manufacturing cost is expensive as a whole. Further, a caution must be also paid to a coefficient of linear expansion and thus a metal material used as the core member of the signal line and the vessel wall being a base is limited. For example, Fe—Ni is used as the core member of the signal line and stainless steel having a large coefficient of expansion is used as the metal material of the vessel wall. As a result, the manufacturing cost is further increased. Further, brittleness is a problem due to the use of glass and thus the glass hermetic seal is difficult to be practically applied to construction machines and civil engineering machines.

Further, in the plastic hermetic seal, a problem arises in the force for bonding the hermetic seal to the metal material of the vessel wall serving as a base and there is a problem in that the plastic hermetic seal cannot be used at high pressure and lacks in durability.

Although the above example describes the structure by which an electric signal supplied from the electric unit disposed in the hydraulic drive unit at high pressure is derived to the outside of the unit at an atmospheric pressure through the signal deriving line, a similar problem may also arise in the case in which an electric signal is derived from an electric unit disposed in the interior of a vacuum vessel having a high degree of vacuum to the outside of the vessel at an atmospheric pressure.

Further, in the general consideration of the above problem, when there is a metal partition member for isolating the interior thereof from the outside such as, for example, a closed metal vessel and the regions on the opposite sides of the partition member must be isolated from each other and units disposed in the respective regions on the opposite sides must be bonded or communicated to each other through any rigid member, there must be provided a structure by which the member is caused to pass through a hole bored in the partition member and the hole is sealed. The seal structure is not limited to the case in which the pressures in the regions on the opposite sides of the partition member are greatly different but must be also applied to the case in which the physical or chemical conditions and the like in the regions on the opposite sides of the partition member are different (there exist different kinds of gases, liquids and the like).

Further, the member passing through the hole bored in the metal partition member is not limited to the afore-said signal deriving line but generally includes a member with necessary rigidity such as a conducting member for transferring an electric signal or electric power, pipe member for flowing various fluids, heat pipe for flowing a heat medium, optical fiber for transferring an optical signal, and the like. The aforesaid problem also arises when these members are caused to pass through the hole bored in the metal partition member and the hole is sealed.

Further, reference is cited here to two Japanese Unexamined Patent Application Nos. Sho 63-214429 and Sho 63-214430 as conventional technical literatures relating to the present invention. Although the technologies disclosed in these literatures are used to bond two members and do not propose a seal structure, they will be described below because these technologies can be understood as similar related technologies.

The technology disclosed in Japanese Unexamined Patent Application No. Sho 63-214429 relates to a structure for bonding a cylindrical member made of fiber-reinforced plastic to a metal mounting member. As shown in, for example, FIG. 1 to FIG. 3 of the literature, the structure is arranged such that an end of the cylindrical member is inserted into a hole bored in the mounting member, a reinforcing member is inserted into the stepped portion in the interior of the cylindrical member, and the portion around the inserting port of the hole of the mounting member is forcibly compressed by a punch pressure to cause plastic deformation (metal flow) to the inner surface of the hole of the mounting member so that the end of the cylindrical member is held by the plastically deformed portion and the reinforced member to thereby bond the cylindrical member to the mounting member. In the embodiment shown in FIG. 1, the metal flow is produced to the inner circumference portion in the vicinity of the opening at one end of the hole by applying a pressure by the punch. Further, the embodiment shown in FIG. 4 of the literature shows a bonding structure made by producing the metal flow to the inner circumferential portions in the vicinity of the openings on the opposite ends of the hole.

Further, the technology disclosed in Japanese Unexamined Patent Application No. Sho 63-214430 relates to a structure for bonding a fiber-reinforced plastic bar-shaped member to a metal mounting member and has substantially the same structure as the bonding structure making use of the metal flow which is described in the above literature (Japanese Unexamined Patent Application No. Sho 63-214429). For example, FIG. 10 of the literature shows the structure by which the metal flow is produced to the inner circumferential surface in the vicinity of the opening at one end of a hole and FIG. 11 of the literature shows the structure by which the metal flow is produced to the inner circumferential surfaces in the vicinity of the openings at the both ends of the hole.

The technologies disclosed in the above two literatures intend to bond the member made of the fiber-reinforced plastic to the metal mounting member by making use of the metal flow technology. From the view point of the sealing performance of a bonded portion, since the aforesaid cylindrical member or bar-shaped member made of the fiber-reinforced plastic is formed by impregnating resin into a hard fiber material such as carbon fiber, glass fiber or the like which is wound by a filament winding method or the like, it has an increased hardness as a whole and does not have desirable elastic plasticity, and thus the member cannot be effectively deformed and cannot exhibit a sufficient sealing performance. Therefore, the technologies disposed in the above two literatures simply intend to bond the fiber-reinforced resin member to the metal mounting member and do not intend to seal the portion between them. This fact is apparent from, for example, Japanese Unexamined Patent Application No. Sho 63-214429 wherein FIG. 7 shows that an O ring for seal is separately provided.

Further, when a problem is indicated from another point of view, although the bonding structure disclosed in Japanese Unexamined Patent Application No. Sho 63-214429 has a ring-shaped reinforcing material disposed in the interior of the cylindrical member of the fiber-reinforced plastic, the axial length thereof is substantially the same as the thickness of the metal mounting member. Therefore, even if the cylindrical member is compressed and bonded from the opposite sides thereof, when a bending stress is applied to the cylindrical member, the bending stress is applied about the circumference of the end of the reinforcing member as a fulcrum, and thus a problem arises in that creep is liable to be caused to the bonded portion and the reliability of the bonded portion is lowered. Further, in the bonding structure disclosed in Japanese Unexamined Patent Application No. Sho 63-214430, since the bar-shaped member made of the fiber-reinforced plastic has low rigidity at the portion thereof where the resin exists, a problem arises in that the vicinity of the compressed portion is locally and concentrically deformed, whereas since the member has high rigidity as a whole, a compressing force cannot be applied to the interior thereof.

An object of the present invention is to provide a seal structure for a member-passing-through hole bored or formed in a metal partition member by which the hole having a member passing therethrough can be sealed securely as well as stably for a long time with a very high pressure resistive performance, the seal structure further being simply arranged and made by a simple process at a low cost, in the structure for sealing the hole bored in the metal partition member, which isolates the inside region thereof from the outside, such as, for example, a pressure vessel, vacuum vessel and closed vessel for accommodating gas and liquid and which has a member such as, for example, a conductor or conductor pin for transferring an electric signal or electric power, other conductors, metal pipe member for flowing fluid, heat pipe for flowing a heat medium, optical fiber for transferring an optical signal, and the like each passing through the hole.

DISCLOSURE OF THE INVENTION

The present invention has the following arrangement to achieve the above object.

There is provided a seal structure for causing a member to pass through a hole bored or formed in a metal partition member, the member having an axial length greater than the thickness of the metal partition member and further desired rigidity, and the hole is sealed by a seal member, wherein the member to be caused to pass through the hole (hereinafter, referred to as a passing-through member) is disposed through the seal member having desired elasticity and plasticity (elastic plasticity) as well as an outside diameter substantially equal to the inside diameter of the hole and an axial length equal to or greater than the thickness of the metal partition member, plastic deformation in the form of substantially uniform swelling from the inside wall surface of the hole to the entire circumference thereof is produced in the vicinity of the opening of the partition member by applying a pressure to the circumferential portion of the opening in the axial direction of the hole to thereby form a constricted portion, and the passing-through member and the seal member are compressed at a high pressure from the entire circumference thereof by the constricted portion and the seal member is confined in the hole in a high pressure state of a degree for preventing the aged yield deterioration of the seal member and the passing-through member is fixed to the hole and the hole is sealed by the internal pressure produced by the confinement.

In the above arrangement, preferably, plastic deformation is produced by applying a pressure to the circumferential portion of the openings at the opposite ends of the hole to form the constricted portions in the openings at the opposite ends of the hole, and the seal member is substantially deformed to a fusiform or barrel shape and confined in the hole in a high pressure state.

Further, in the above arrangement, preferably, a deformation restricting member is disposed to the inner circumferential portion of the opening at an end of the hole to prevent the seal member from swelling to the outside of the hole and deforming, and the constricted portion is formed by producing the plastic deformation by the application of the pressure to the circumferential portion of the opening at the other end of the hole to thereby deform the seal portion and confine the same in the hole in a highly pressurized state.

The deformation restricting portion is preferably formed as a stepped-hole portion by reducing the diameter of the opening at an end of the hole. Further, the inner surface of the stepped-hole portion may be tapered.

Further, the passing-through member may be an electric conducting member for transferring an electric signal or electric power, and in this case the seal member is an electric insulator for covering the electric conducting member. Further, the electric conducting member is a line-shaped member or pin-shaped member. An example of the electric conducting member includes a terminal provided for a closed type case for accommodating an electric device to conduct electricity.

Further, the passing-through member may be a pipe member for transferring gas or liquid. An example of the pipe member includes a heat pipe for flowing a heat medium.

The passing-through member may be an optical fiber for transferring an optical signal.

The seal member is preferably formed by using a synthetic resin. Any one of PPS (Polyphenylene Sulfide), PEI (Polyetherimide), PEEK (Polyetherketone), PI (Polyimide) and a synthetic resin material similar to them is used as the above synthetic resin.

An example of the aforesaid metal partition member includes the wall portion of a vessel having a pressure difference between the opposite regions thereof. More specifically, the metal partition member is a pressure vessel whose inside region is in a high pressure state and whose outside region is in an atmospheric pressure state, a vacuum vessel whose inside region is in a vacuum state and whose outside region is in an atmospheric pressure state, the wall portion of a vessel whose opposite regions have a different physical or chemical circumstance, or a metal portion provided for a general closed vessel. An example of a different physical circumstance includes, for example, a case in which a gas or liquid exists in the inside region and the outside region of a vessel has a different phase.

Further, the metal partition member may be various kinds of a seal plug mounted on a closed vessel. The passing-through members may be provided for the seal plug in any optional number.

Further, any one of the surface of the passing-through member and the inner circumferential surface of the hole may be roughly processed. Further, an irregular portion may be formed on the surface of the portion of the passing-through member which is located in the hole. At least one annular groove may be formed as the irregular portion.

An example to which the seal structure is applied is the case that the pressure vessel is a portion of a hydraulic circuit mechanism having a high pressure operating fluid therein, and the passing-through member is an electric signal line extracted to derive a signal, which is sensed by an electric sensor unit disposed in the pressure vessel for sensing information regarding a hydraulic pressure, to the outside of the vessel.

Another example is the case that the metal pressure vessel is a vessel which forms a valve casing having a high pressure operating fluid therein and has a displacement sensor located in the operating fluid, and the passing-through member is an electric signal line for deriving a signal sensed by the displacement sensor to the outside of the vessel.

A characteristic action will be described. For example, when a core member covered with a synthetic resin seal member having elastic plasticity is caused to pass through the hole formed in the metal partition member (metal base) and a compressing action for caulking is applied to the circumferential portion of the openings of the hole by using pressure application metal fixtures, plastic deformation is produced to the metal portion (inner circumferential surface of the hole) around the openings of the hole so that an annular swelled portion is formed to the inner wall surface of the passing-through hole by the plastic deformation. The swelled portion formed by the plastic deformation of the metal base has an annular shape which is substantially uniformly and inwardly swelled over the entire circumference of the hole from the inner wall thereof in the vicinity of the openings of the hole. The swelled portion compresses the seal member from the entire circumference thereof to crush and deform the same to satisfy predetermined conditions, whereby the core member is fixed and the hole is sealed. The hole through which the core member is caused to pass is sealed with a high seal performance by the internal pressure resulting from the constricting and compressing action effected by the swelled portion produced by the plastic deformation of the metal base and the confinement (e.g., deformation to a fusiform shape) of the synthetic resin seal member in the hole effected by a high pressure having a degree to prevent the aged yield deterioration of the seal member.

BRIEF DESCRIPTION OF THE DRAWINGS

FIG. 6 is a table showing the result of an impulse test with respect to the seal structure of the present invention;

FIG. 9 is a table showing the relationship between the temperature and the conductor extracting force in the seal structure of the present invention;

BEST MODE OF CARRYING OUT THE INVENTION

Preferable embodiments of the present invention will be described below with reference to the accompanying drawings.

Figure 1:
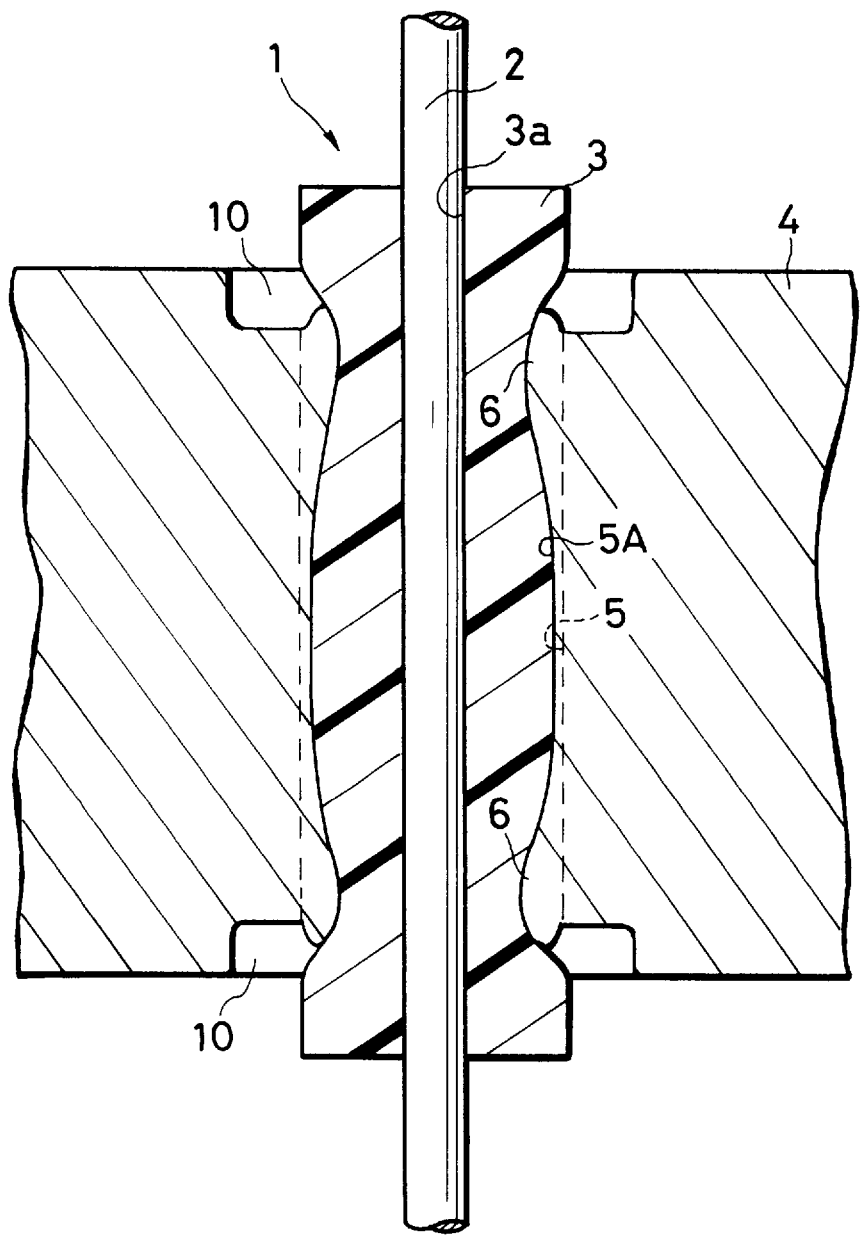
FIG. 1 is a longitudinal cross sectional view of the main portion of a basic embodiment of the present invention which shows a structure arranged such that a predetermined member such as a conducting member or the like passes through the hole bored in a metal partition member and the hole is sealed.
Figure 2:
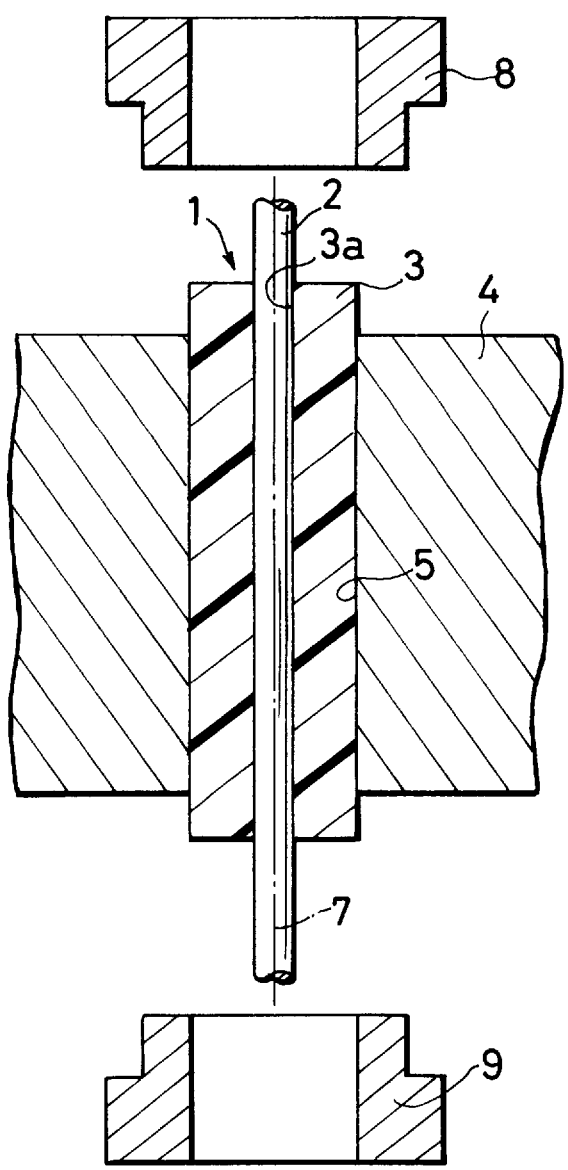
FIG. 2 is a longitudinal cross sectional view of the main portion of a first state (before a compressing force is applied) for explaining a process for making a seal structure of the present invention.
Figure 3:
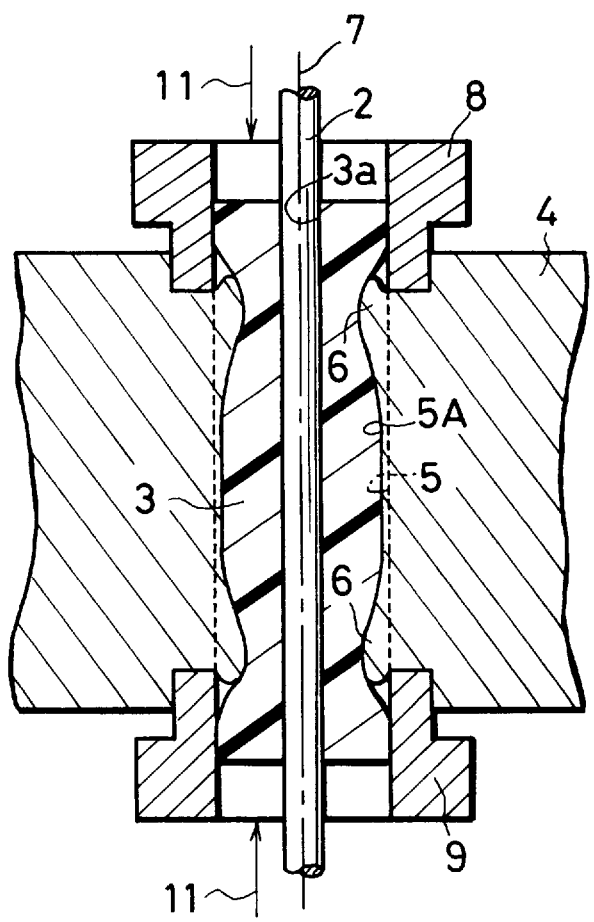
FIG. 3 is a longitudinal cross sectional view of the main portion of a second state (after the compressing force is applied) for explaining the process for making the seal structure of the present invention.

FIG. 1 shows a typical example of the seal structure according to the present invention by which a predetermined member such as a conducting member or the like is caused to pass through a hole bored or formed in a metal partition member, the hole is sealed in this state and the member is fixed to the hole. FIGS. 2 and 3 show processes by which the seal structure is made.

In the embodiment shown in FIG. 1 to FIG. 3, reference numeral 4 partially designates the cross section of a metal base which has a function as a metal partition member as a whole. Reference numeral 5 designates a hole bored in the metal base which has openings at the upper and lower portions in the Figure so that the opposite regions of the metal base 4 communicate to each other through the hole. The hole designated by reference numeral 5 is a hole before the seal structure according to the present invention is formed and a hole 5A to be described later is a hole after the seal structure has been formed. Reference numeral 1 designates a member which is caused to pass through the hole 5 of the metal base 4 and thereafter fixed in the hole 5 by applying the seal structure according to the present invention to the hole 5, and in this embodiment the member 1 is a conducting member comprising a conductor 2 and insulator 3. The conductor 2 is covered with the insulator 3 in the conducting member 1. The conducting member 1 is used to transfer, for example, an electric signal or electric power and has a suitable axial length capable of projecting at least to the outside of the openings at the opposite ends of the hole 5. That is, the length of the conducting member 1 is greater than the thickness of the metal base 4.

When the conducting member 1 is caused to pass through the hole 5 of the metal base 4 and the seal structure according to the present invention is formed to the hole 5 as described later, the hole 5 has a reduced diameter and is made to the hole 5A as shown in FIG. 1.

Since the conducting member 1 is used to transfer an electric signal or electric power as described above, the insulator 3 is indispensable to electrically insulate and protect the conductor 2 from other conductive members. Therefore, the member fixed in the state that it is caused to pass through the hole 5 is composed of the conductor 2 and insulator 3 which are integrally formed and inseparable from each other. This embodiment is characterized in that the insulator 3 formed of a synthetic resin having necessary elastic plasticity (elasticity and plasticity) is used to fix the conductor 2 to the hole 5 as well as a seal member for sealing the hole 5 with a very excellent seal performance.

According to the description of the embodiment, although the member which is caused to pass through the hole 5 and fixed thereto is the conductor 2 and the seal member for sealing the hole 5 is the synthetic resin insulator 3, generally speaking, the member to be caused to pass through the hole 5 and fixed thereto is a member having rigidity (member serving as a core member) and the seal member for sealing the hole 5 is a synthetic resin member which covers the core member and has necessary elastic plasticity, axial length and volume.

Various kinds of members can be contemplated as the member to be caused to pass through the hole 5 and fixed thereto and specific examples of them will be described later. When another passing-through member is mounted to the hole 5 and the hole 5 is sealed, however, a synthetic resin as a seal member has substantially the same material as that of the insulator 3 but acts only as the seal member because an insulating function is not always required of the seal member.

The seal performance of the seal structure according to the present invention has a high pressure and impact resistance and can stably maintain a sealed state for a long time.

FIG. 1 shows the state in which the hole 5A is formed by applying the seal structure according to the present invention to the hole 5 of the metal base 4 in the state that the conducting member 1 is caused to pass through the hole 5 of the metal base 4, and the conducting member 1 is fixed to the hole 5 and the hole 5 is sealed by the plastic deforming (metal flow) action of the metal base 4 and the deforming action based on the elastic plasticity of the insulator 3.

The metal base 4 is the wall portion of a vessel such as, for example, a pressure vessel whose interior is at high pressure, vacuum vessel whose interior is at high vacuum, closed vessel containing gas or liquid in the interior thereof in a sealed state, and the like, and the base 4 is a metal portion in the wall portion. The metal base 4 is a partition member for isolating the regions on the opposite sides thereof. When the metal base 4 is a portion of the vessel, the metal base 4 isolates the region inside the vessel from the region outside the vessel. When the metal base 4 is the pressure vessel or vacuum vessel, the region inside the metal base 4 is in a high pressure or vacuum state, and the region outside the metal base 4 is at an atmospheric pressure. That is, the metal base 4 preferably acts as a partition member for the two regions where a pressure difference exists.

Further, as another example, different kinds of gases or liquids having substantially the same pressure may exist in the regions on the opposite sides of the metal base 4 and in this case the metal base 4 may act as a partition member for the two kinds of the gases or the like. When this is generalized, the metal base 4 may be used as a partition member for physically (chemically) different circumstances in the regions on the opposite sides thereof. In addition to the above, the case in which the same kind of gas or liquid has a different phase (state or property) in the regions on the opposite sides may be supposed as the difference of the physical circumstance.

The metal base 4 has a thickness of, for example, about 3–10 mm. Further, any arbitrary metal in which plastic deformation can be produced such as copper, mild steel, aluminium-based alloy, bronze, stainless steel (SUS), and the like can be used as the specific material of the metal base 4.

Further, the metal base 4 may be arranged as a plug which is detachably mounted to the metal member provided with a portion of a vessel formed of a material other than metal or to a vessel formed of a material other than metal. To realize the seal structure according to the present invention, the base 4 itself must be intrinsically formed of a metal material, but the vessel must not be always formed of metal.

As described above, the conducting member 1 comprises the conductor 2 as the core member and the insulator 3 for covering the conductor 2 and maintaining insulation between the conductor 3 and the metal base 4. It is important that the insulator 3 acts as the seal member. The insulator 3 preferably has a length equal to or greater than the thickness of the metal base 4. The conductor 2 and insulator 3 preferably project to the outside of the openings at the opposite ends of the hole 5.

The conductor 2 is composed of, for example, a line-shaped member or pin-shaped member having high rigidity and acts as an electric signal deriving line or electric connecting member. The conductor 2 as the line-shaped member is, for example, a bare wire and the conductor 2 as the pin-shaped member is a pin used, for example, as an interchange terminal, current supply terminal and the like. FIG. 1 shows a portion of the conductor 2 as the line-shaped member or pin-shaped member. The conductor 2 has a diameter of, for example 0.5 mm.

Further, when the conductor 2 is the pin used as an interchange terminal, current supply terminal or the like, the terminal is connected to a closed type case for accommodating an electric device in the interior thereof and the metal base 4 is a portion of the closed type case. Usually, the electric device is a device composed by using semiconductor elements and the like.

The insulator 3 is made of a material having elastic plasticity and has an action for insulating the conductor 2 and metal base 4 as well as an action as a seal member for sealing the hole 5 when the conducting member 1 is fixed to the hole 5. A synthetic resin member is preferably used as the material of the insulator 3. The specific material of the synthetic resin member is, a relatively hard resin such as, for example, polyphenylenesulfide (PPS), polyetherimide (PEI), polyetherketone (PEEK), polyimide (PI) and the like. The seal performance at the hole 5 is greatly improved by the seal action of the insulator 3 as the seal member and the insulator 3 has a very high resistance against a force for pushing out the conductor 2. The insulator 3 has, for example, a tubular shape and is provided with a hole 3*a* formed in the central axial portion thereof so that the conductor 2 is caused to pass therethrough. The hole 3*a* of the insulator 3 is formed to a suitable diameter from the view point of seal structure to be described below. It is preferable that the inside diameter of the hole 3*a* of the insulator 3 is substantially equal to the diameter of the conductor 2. In general, the conducting member 1 is fabricated by inserting the conductor 2 provided independently of the insulator 3 into the hole 3*a* of the tubular-shaped insulator 3. Further, it is preferable that the outside diameter of the insulator 3 is substantially equal to the inside diameter of the hole 5 of the metal base 4. In other words, it is ideal that the space between conducting member 1 and the inner surface of the hole 5 is zero in the state that the conducting member 1 is caused to pass through the hole 5. As a numerical value, the outside diameter of the insulator 3 (diameter of the outer circumferential surface) of the insulator 3 is, for example, about 1.6 mm.

As another method of fabricating the conducting member 1, there is a method by which the line-shaped conductor 2 is put into a vessel in which a melted synthetic resin is accommodated and the conductor 2 is caused to pass through a hole having a predetermined diameter so that the synthetic resin is naturally adhered to the conductor 2 and further the synthetic resin is cooled later so that the synthetic resin is adhered to the surface of the conductor 2 as a covering member. In this case, the insulator 3 as the synthetic resin is intimately and strongly adhered to the surface of the conductor 2.

The conducting member 1 composed of the conductor 2 and the insulator 3 covering the conductor 2 is caulked or sealed by the swelled portions 6 of the metal base 4 in the vicinity of the openings at the opposite ends of the hole 5 in the state that the conducting member 1 is caused to pass through the hole 5 bored in the metal base 4. The swelled portions act as constricting portions. The conducting member 1 is strongly fixed to the hole 5 of the metal base 4 by a compressing force (tension applying force) produced based on the deformation of the upper and lower swelled portions 6 and insulator 3 as well as the hole 5 for extracting the conducting member 1 being sealed based on the deformation of the upper and lower swelled portions 6 and insulator 3.

The physical action of the seal structure according to the present invention will be described in more detail.

According to the seal structure shown in FIG. 1, when a pressure (compressing force) is applied to the metal base 4 around the openings at the opposite ends (upper and lower sides in FIG. 1) of the hole 5 to caulk the conducting member 1 passing through the hole 5, plastic deformation (plastic flow) is produced to the metal base in the vicinity of the upper and lower openings of the hole 5 in FIG. 1 and a portion of the metal base is moved to the central axis side of the hole 5 and to the central side in the axial direction of the hole by the plastic deformation so that the swelled portions 6 are formed. Each of the swelled portions 6 formed at the opposite ends of the hole 5 is substantially uniformly swelled from the inner wall surface of the hole 5 inwardly over the entire circumference of the hole and formed to an annular shape. The insulator 3 having elastic plasticity is strongly crushed around the entire circumference thereof by the swelled portions 6 formed in the vicinity of the openings at the opposite ends of the hole 5 and having a constricting action. At this time, the insulator 3 acts as the seal member and is uniformly deformed inwardly over the entire circumference thereof based on the elastic plasticity thereof by the compressing action of the swelled portions 6. The insulator 3 is deformed to substantially a fusiform shape (or barrel shape) as an entire configuration and maintained in the state from which it cannot escape, and thus an internal pressure produced therein is confined in the space regulated by the upper and lower swelled portions 6 with a pressure so high as to prevent the aged yield deterioration of the insulator 3. The thus deformed insulator 3 fixes the conductor 2 by the very strong internal pressure and exhibits a seal action having a very high resistance against pressure. Further, the insulator 3 can stably provide a seal for a long period by the seal action.

In the above mentioned case, the metal base 4 is preferably a portion of the vessel wall of a pressure vessel whose interior is in a high pressure state or a vacuum vessel whose interior is at a high vacuum, and the conducting member 1 has a function as the signal transferring member or electric power transferring member for deriving an electric signal or power supplied from an electric unit such as a pressure sensor or the like disposed in the high pressure circumstance or other electric unit disposed in a high vacuum circumstance to the outside of the vessel, as described above.

Next, a process by which the conducting member 1 is fixed to the hole 5 of the metal base 4 and the seal structure is formed will be described with reference to FIGS. 2 and 3.

In FIG. 2, the conducting member 1 composed of the conductor 2 and insulator 3 is caused to pass through the hole 5 bored in the metal base 4 and disposed therein and each of two annular pressure application metal fixtures 8 and 9 is disposed to the vicinity of each of the openings at the opposite ends of the hole 5 in the state that the position of a central axis is aligned with the center line 7 of the conducting member 1. In this disposed state, the two pressure application metal fixtures 8 and 9 are moved towards the metal base 4 along the center line 7 and forcibly inserted into the circumferential portion of the metal base 4 around the openings of the hole 5 by applying a necessary compressing force 11. The pressure application metal fixtures 8 and 9 may be forcibly inserted by any arbitrary method. That is, they may be forcibly inserted in a short time by being hittingly compressed or may be slowly inserted by taking a relatively long time. Further, the two pressure application metal fixtures 8 and 9 may be simultaneously inserted forcibly or inserted forcibly with a time lag. A device for making the pressure application metal fixtures 8 and 9 forcibly inserted is not shown.

When the pressure application metal fixtures 8 and 9 carry out the forcibly compressing action, they apply a pressure 11 (compressing force) to the metal base 4 and produce plastic deformation to form the swelled portions 6, as shown in FIG. 3. Each of the swelled portions 6 has an annular shape along the entire circumference of the inner wall surface of the hole 5. The swelled portions 6 have an amount of swell substantially equal to an amount of compression effected by the pressure application metal fixtures 8 and 9. When the swelled portions 6 are formed by the plastic deformation of the metal base 4, a constricting and compressing force is applied to the insulator 3 of the conducting member 1 based on the swelled portions 6. The insulator 3 formed of the synthetic resin and having elastic plasticity is constricted by the constricting and compressing force applied by the swelled portions 6 of the metal base 4 located in the vicinity of the openings at the opposite ends thereof and confined in the above hole in a high pressure state having a degree to prevent the aged yield deterioration of the insulator 3. As a result, the insulator 3 is deformed substantially to a fusiform shape. The conductor 2 of the conducting member 1 is very strongly fixed by the compressive stress produced by the insulator 3 deformed to the fusiform shape by the constricting and compressing force so that the seal structure for the hole 5 through which the conducting member 1 is caused to pass is formed.

Since the portion of the metal base around the openings at the opposite ends of the hole 5 is forcibly compressed by the pressure application metal fixtures 8 and 9, annular grooves 10 are formed around the openings as shown in FIG. 1.

Further, the forcible compressing action carried out by the pressure application metal fixture may be effected at the two positions of the openings at the opposite ends of the hole 5 by using the two pressure application fixtures 8 and 9 or only at any one position of the openings at the opposite ends of the hole 5 by using one of the pressure application metal fixtures. The action carried out at the two positions is suitable for the seal of liquid, gas and the like at high pressure. Further, a fluid having a relatively low pressure may be sealed at one position.

Figures 4, 5:
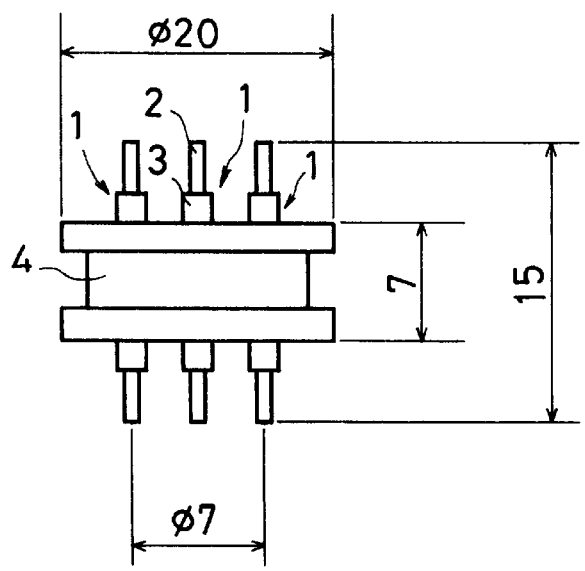
FIG. 4 is a table showing the relationship between the compressing force applied by a pressure application metal fixture and an extracting force of a conductor as a core member represented by experimental numerical values.
FIG. 5 is a front elevational view schematically showing a test piece for obtaining the result of an experiment with respect to the performance of the seal structure according to the present invention.

Next, FIG. 4 is a table showing an example of specific numerical values obtained experimentally with respect to the relationship between the compressing force (compressing load) applied by the pressure application metal fixtures and the extracting force of the conductor 2 of the conducting member 1 fixed to the metal base 4. FIG. 5 shows a schematic view with respect to the dimension of a test piece used in the experiment. In FIG. 5, a length is represented by the unit of millimeter, and at least three conducting members 1 are attached to the metal base 4 in the Figure. The material of the metal base 4 is free-cutting brass and the material of the conductor 2 is a Fe—Ni wire. The table of FIG. 4 shows extracting forces when two kinds of insulators A and B composed of a different material (synthetic resin) were used as the insulator 3 to respective compressing forces. The insulator A was composed of PPS and the insulator B was composed of PEEK. As apparent from the table of FIG. 4, when the compressing force is increased, the extracting force is also increased. Further, the extracting force is different depending upon the material of the insulator 3.

FIG. 6 is a table showing the result of an impulse test (three wave impulse) with respect to a pressure resistance. In this test, a base pressure was 350 kgf/cm$^2$, a peak pressure was 525 kgf/cm$^2$, a test vessel and test oil had a temperature of 100° C., and the number of repetitions was one million times (once per a second). The two kinds of the synthetic resin materials (PPS, PEEK) were also used in this test. A result of no problem (OK) was obtained with respect to a compressing force of 300–500 kgf when the insulator was composed of PPS, and a result of no problem (OK) was obtained with respect to a compressing force of 300–600 kgf when the insulator was composed of PEEK.

Next, with reference to FIG. 7, a distribution of compressive stress in the radial direction on the inner circumferential surface of the insulator 3 will be described which was obtained in the state that the pressure application metal fixture 8 was forcibly inserted into the metal base 4 and then removed therefrom. In this case, PEEK was used as the material for forming the insulator 3 and the conductor 2 and metal base 4 were composed of the aforesaid materials.

Figure 7:
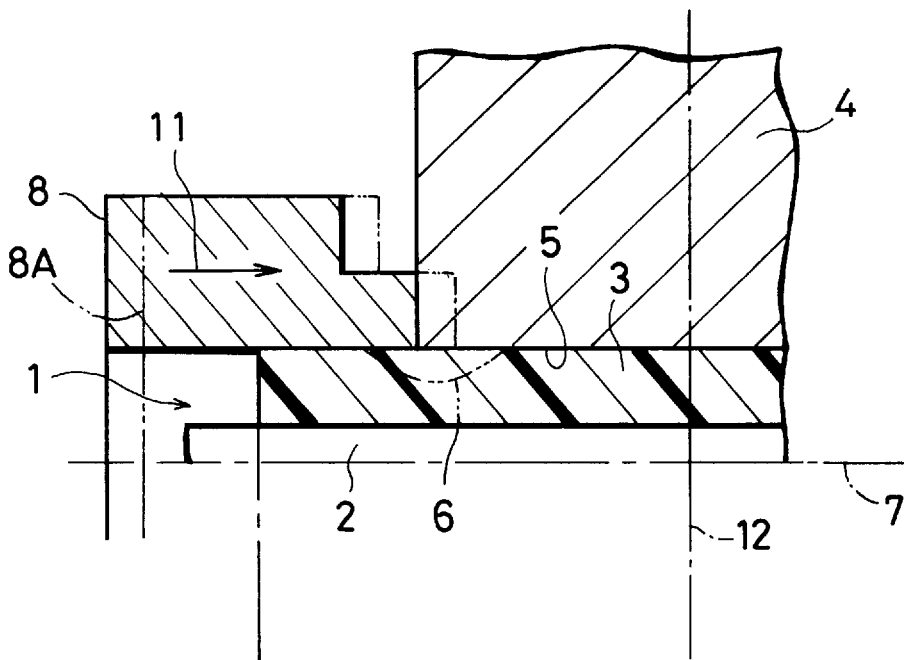
FIG. 7 is a diagram showing the distribution of a compressed stress on the inner circumferential surface of a synthetic resin (seal member) produced when a metal base is forcibly compressed by a pressure application metal fixture.
Figure 7:
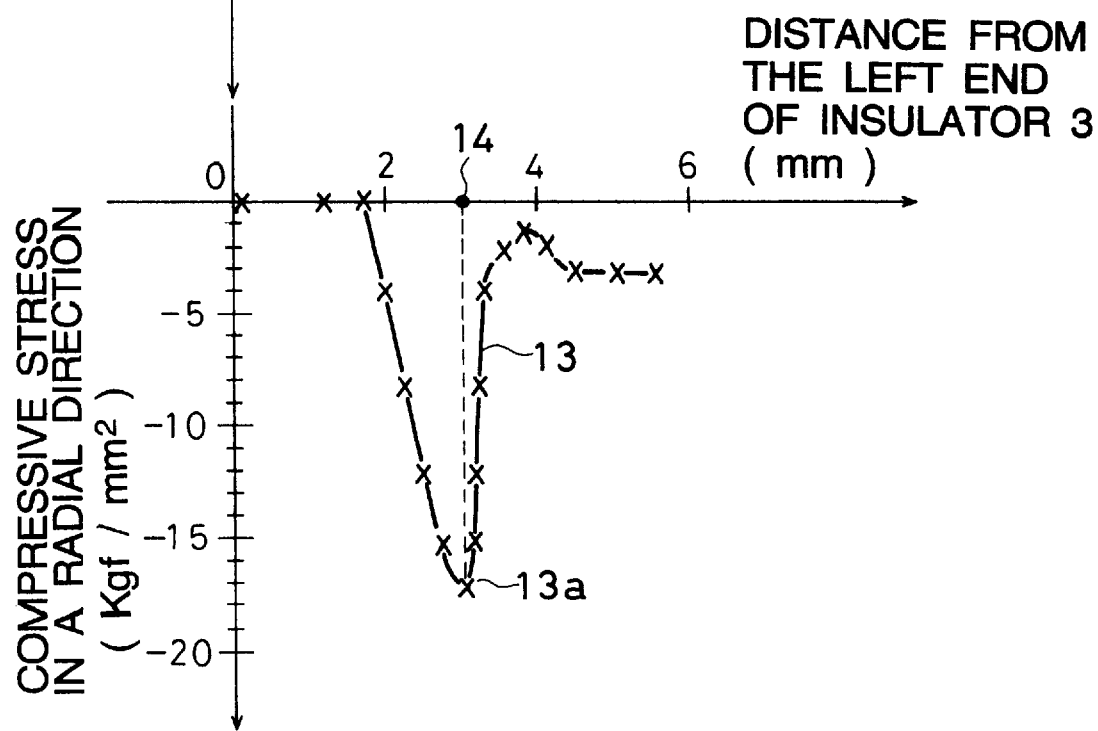

In the upper drawing of FIG. 7, reference numeral 2 designates a conductor, reference numeral 3 designates an insulator and reference numeral 4 designates a metal base. A conducting member 1 composed of the conductor 2 and the insulator 3 is horizontally shown in the upper drawing of FIG. 7 with only the upper left half portion thereof for the convenience of description. Reference numeral 8 designates a pressure application metal fixture and only a half portion thereof is shown. Reference numeral 8A also designates the pressure application metal fixture shown by a two-dot-and-dash-line which has been forcibly inserted in the direction of a compressing force 11. Reference numeral 7 designates a center line. When the pressure application metal fixture 8 is forcibly inserted into the position 8A by the compressing force 11, plastic deformation is produced over the entire circumference of the inner wall surface of the hole 5 in the metal base 4 in the vicinity of the opening thereof so that the aforesaid swelled portion 6 is formed.

The lower drawing of FIG. 7 shows a result of the simulation of the caulking process effected by the pressure application metal fixture 8 to the metal base 4 around the opening of the hole 5, the simulation being executed by using a non-linear structural analysis program (NIKEH/2D). An analyzing model is two dimensional axis symmetry. As constricting conditions, respective portions were movable in the directions parallel to a center line 12. In the lower drawing of FIG. 7, the coordinate of the abscissa corresponds to the positional relationship in the upper drawing of FIG. 7 and shows a distance from the left end of the insulator 3 (which is the origin) and the ordinate represents a compressive stress in the radial direction on the inner circumferential surface of the insulator 3. In the thus obtained stress distribution curve 13, a compressive stress is represented by a minus stress value.

As shown in the stress distribution curve 13 of FIG. 7, the conductor 2 is fixed by a large fastening force applied by the insulator 3. According to the stress distribution curve 13, a compressive stress portion 13a serving as a large fastening force is particularly produced at the position (point 14) inside the metal base rather than on the surface thereof where a pressure is applied by the pressure application metal fixture 8 and a compressive stress of about 3 kgf/mm$^2$ is produced to the portion other than the above. As shown in the stress distribution curve 13, the conductor 2 as the core member of the conducting member 1 is strongly fixed and held by the internal pressure produced to the insulator 3 by the constricting and compressing force applied to the insulator 3 based on the pressure applied by the pressure application metal fixture 8. Note that a peak value of about 16 kgf/mm$^2$ or higher is produced at the above portion 13a fastened by the large fastening force. A seal structure having a very excellent seal performance can be formed by the peak value. Further, the stress distribution 13 can be arbitrarily changed by changing an amount of insertion by adjusting the compressing force. The characteristics of the above stress distribution are also formed to the right end portion of the insulator 3 in a form symmetrical to the distribution shown in the lower drawing of FIG. 7.

Figure 8:
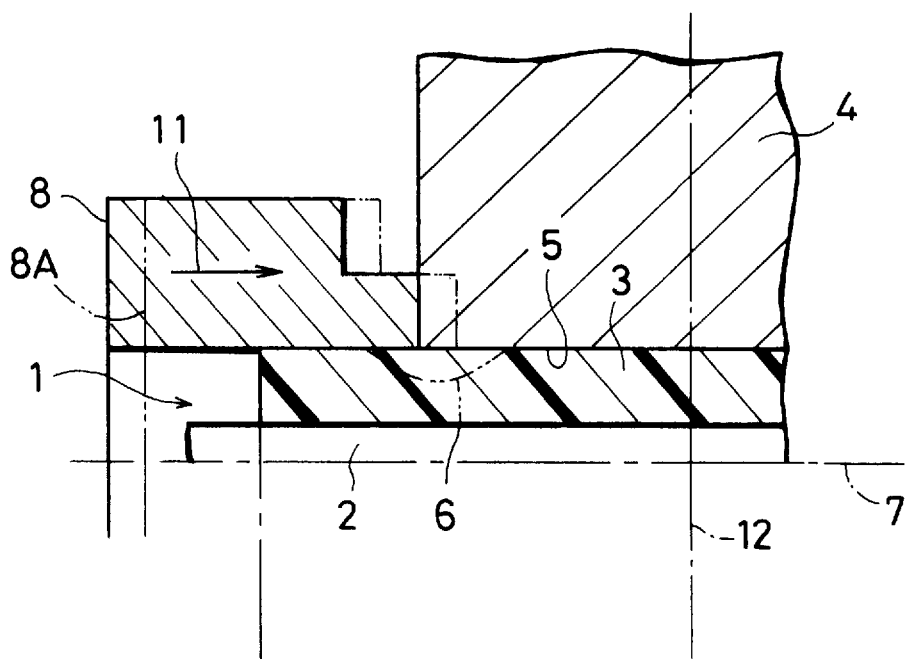
FIG. 8 is a diagram showing the distribution of a compressed stress on the outer circumferential surface of a synthetic resin (seal member) produced when the metal base is forcibly compressed by the pressure application metal fixture.
Figure 8:
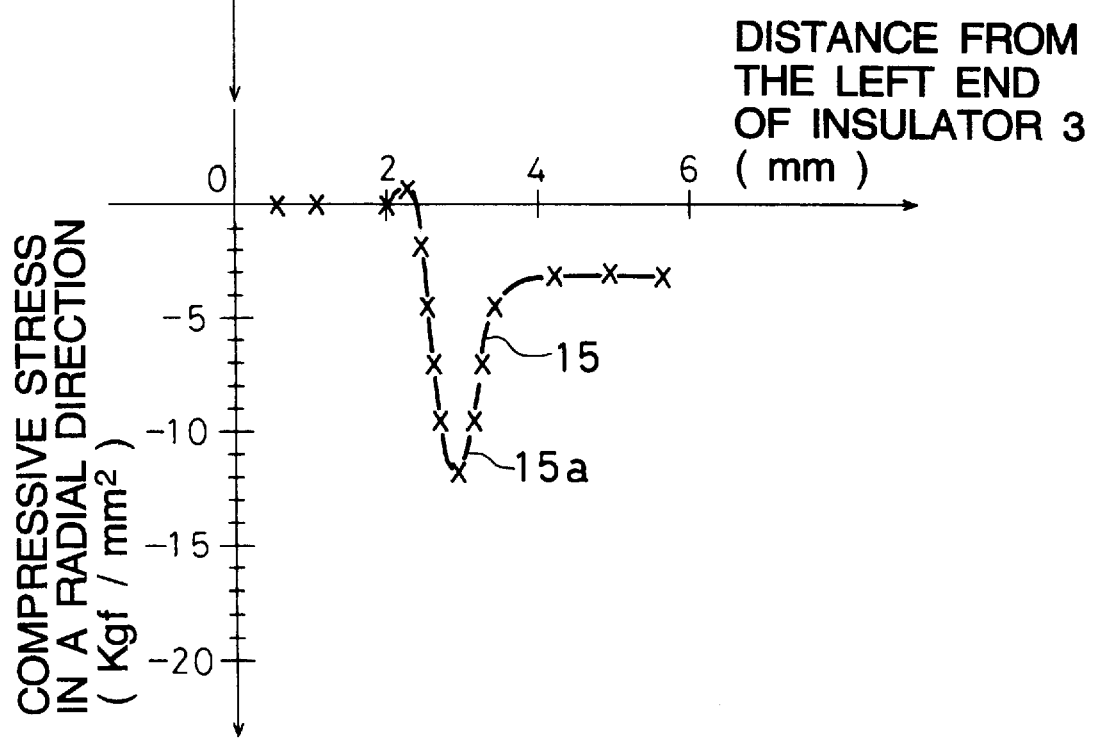

FIG. 8 shows the compressive stress distribution in the radial direction on the outer circumferential surface of the insulator 3 obtained in the state that the pressure application metal fixture 8 was forcibly inserted into the metal base 4 and then removed therefrom.

The upper drawing of FIG. 8 is similar to that of FIG. 7, and the lower drawing of FIG. 8 is substantially similar to that of FIG. 7 and shows the distribution of a compressive stress in the radial direction on the outer circumferential surface of the insulator. This is also a result of analysis of the processing simulation executed by using the non-linear structural analysis program (NIKEH/2D). According to a stress distribution curve 15, also in the outer circumferential surface of the insulator 3, a large fastening force portion 15a is produced at the position inside the metal base rather than the surface thereof to which a pressure is applied by the pressure application metal fixture 8 and a compressive stress of about 3 kgf/mm$^2$ is also produced to the central portion other than the above. It is apparent that the conductor 2 is held by the constricting and compressing force and the deformation of the insulator 3 accompanying thereto. Further, a peak value of about 12 kgf/mm$^2$ is obtained at the fastening force portion 15a and a seal structure having a very excellent seal performance can be formed by the peak value.

It is also apparent from the above processing simulations that the conductor 2, insulator (i.e., the synthetic resin material as the seal member) 3 and metal base 4 execute a seal action while being subjected to the compressive force, respectively. As a result, a seal structure for the member-passing-through hole of a metal partition member having a very high pressure resistance can be realized.

Next, the relationship between a temperature increase and an extraction force will be described with reference to the table shown in FIG. 9. The relationship between the temperature increase and the extraction force is obtained in such a manner that the compressing force applied by the pressure application metal fixture is set to 600 kgf and the aforesaid insulator B (PEEK) is used as the insulator. The material of the conductor 2 and metal base 4 is the same as above. According to the table of FIG. 9, the extracting force at a high temperature of 120° C. is lowered to half the extracting force at −40° C. However, the extracting force of 7 kgf at 120° C. is sufficient when it is taken into consideration that the conductor 2 has a small diameter (about 0.5 mm in practical use). In calculation, when a signal is derived from the interior of a pressure vessel having an internal pressure of 350 kgf/cm$^2$, a safety factor is 12.

Figure 10:
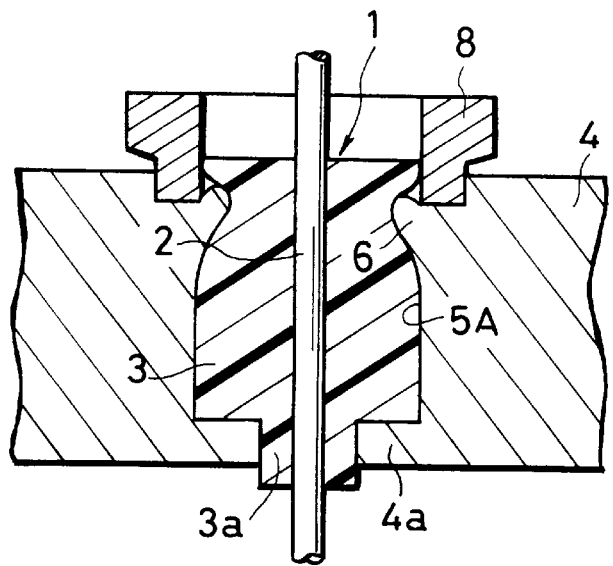
FIG. 10 is a longitudinal cross sectional view of the main portion of another embodiment of the seal structure according to the present invention.

FIG. 10 shows another embodiment of the seal structure for the member-passing-through hole according to the present invention. FIG. 10 corresponds to FIG. 3 and the same reference numerals as used in FIG. 3 are used to designate the substantially same elements in FIG. 10. In the structure of the embodiment, an annular projection is initially formed to, for example the lower opening of the hole 5A bored in the metal base 4, projects inwardly in a radial direction and arranged as a stepped-hole 4a. Therefore, the lower opening of the hole 5A has a diameter smaller than the other portion of the hole. The conducting member 1 is inserted from the upper opening of the hole 5 before it is compressed. A small diameter portion is defined to the lower end of the insulator 3 of the conducting member 1 to form a stepped portion 3a. The stepped portion 3a is engaged with the stepped-hole 4a to prevent the conducting member 1 from being extracted from the lower opening of the hole 5A. Only an upper pressure application metal fixture 8 is disposed. When the upper pressure application metal fixture 8 is forcibly inserted into the metal base 4 in the state that the conducting member 1 is disposed in the hole 5 of the metal base 4, the hole 5A is formed to provide the seal structure shown in FIG. 10. Since the stepped-hole 4a prevents the extraction of the insulator 3, the aforesaid swelled portion 6 is formed to the opening at the upper end of the hole 5A by the plastic deformation of the metal base 4 produced by the pressure applied by the pressure application metal fixture 8 and thus a constricting and compressing force is produced to deform the insulator 3. At this time, the deformation of the lower portion of the insulator 3 is restricted by the stepped-hole 4a, and as a result the insulator 3 is confined in the space determined by the stepped-hole 4a and swelled portion 6. According to the arrangement of the embodiment, a seal structure which has a high pressure resistant performance and requires only one pressure application metal fixture can be made.

Figure 11:
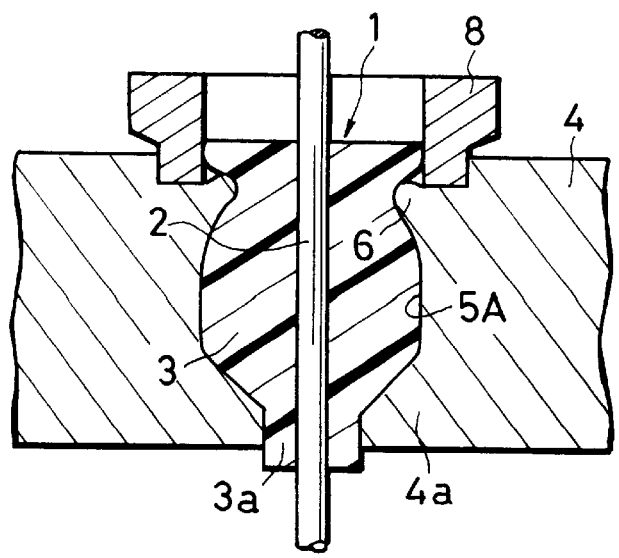
FIG. 11 is a longitudinal cross sectional view of the main portion of a further embodiment of the seal structure according to the present invention.

FIG. 11 shows a modification of the embodiment shown in FIG. 10. In this embodiment, the upper surface of the stepped-hole 4a bored in the lower portion of the hole 5A, i.e., the inner surface of the hole 5A is tapered. The structure of this embodiment is similar to that described with reference to FIG. 10 except the above. According to the embodiment, when the metal base 4 around the opening at the upper end of the hole 5 is forcibly compressed by the pressure application metal fixture 8, the swelled portion 6 is formed on the inner surface of the hole in the vicinity of the upper end opening by plastic deformation as well as the lower stepped-hole 4a acting as a deformation restricting portion so that the insulator 3 is confined.

Figure 12:
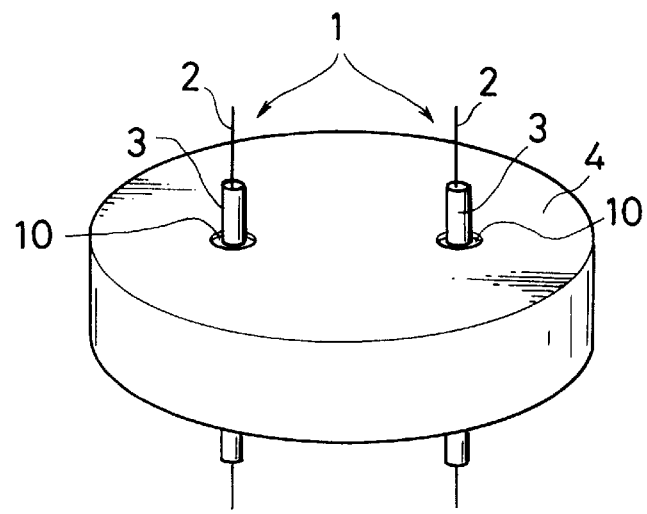
FIG. 12 is a perspective view of the outside appearance of a metal base to which two conductors are attached by being applied with the seal structure of the present invention.

FIG. 12 shows an example of the outside constitution arranged such that two holes, for example, are bored in the metal base 4 and the conducting member 1 is caused to pass through each of the holes and is sealed by the aforesaid seal structure shown in, for example, FIG. 1. For the convenience of description, the metal base 4 is shown by cutting out the circumference of the portion where the seal structure is formed. As apparent from FIG. 12, the annular groves 10 are formed by caulking the circumference of the openings by the pressure application metal fixture 8. Note, this conducting member 1 uses the line-shaped conductors 2 or lead wires.

Figure 13:
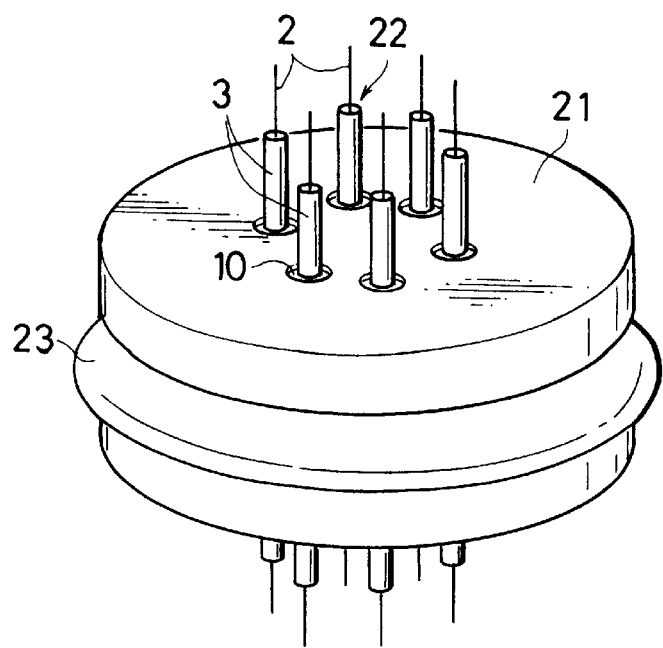
FIG. 13 is a perspective view of the outside appearance of a plug to which a multiplicity of conductors are attached by being applied with the seal structure of the present invention.

FIG. 13 shows an embodiment of a plug in which a plurality of conductor extracting portions are formed by the application of the aforesaid seal structure. The plug 21 is formed with six conductor extracting portions 22 respectively for extracting the line-shaped conductor 2. The material of the plug 21 is the same as that of the aforesaid metal base, an annular recess is formed to the circumferential surface of the plug 21 and an O ring 23 is mounted to the recess. With respect to the other arrangement, the same reference numerals as used in FIG. 12 are used to designate the same elements in FIG. 13.

Figure 14:
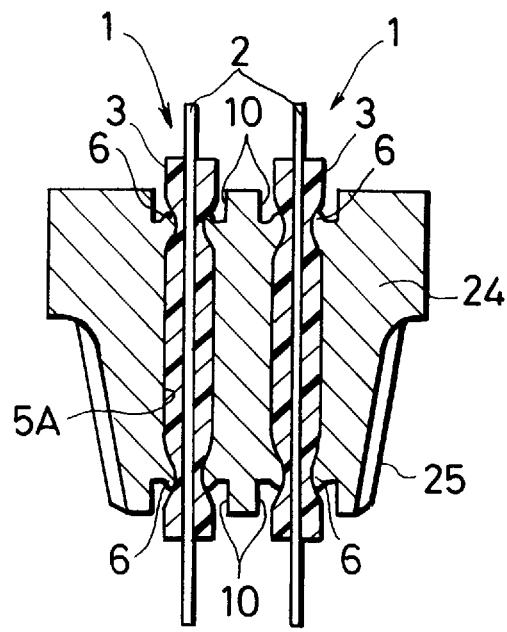
FIG. 14 is a longitudinal cross sectional view of a screw type plug to which at least two conductors are attached by being applied with the seal structure of the present invention.

FIG. 14 shows an embodiment in which the seal structure shown in FIG. 1 is applied to the conductor extracting portions provided for a screw type plug. The screw type plug 24 has a screw portion 25 formed on the lower circumferential surface thereof and mounted to a mounting portion by being threaded with the screw hole thereof so that the plug 24 exhibits high seal performance. As shown in FIG. 14, at least two conductors 2 are fixed to the holes 5A bored in the screw type plug 24 in the state that each of them is covered with the fusiform insulator 3, and thus the aforesaid seal structure is formed to each of the conducting members 1. The material of the screw type plug 24 is the same as that of the aforesaid metal base.

Figure 15:
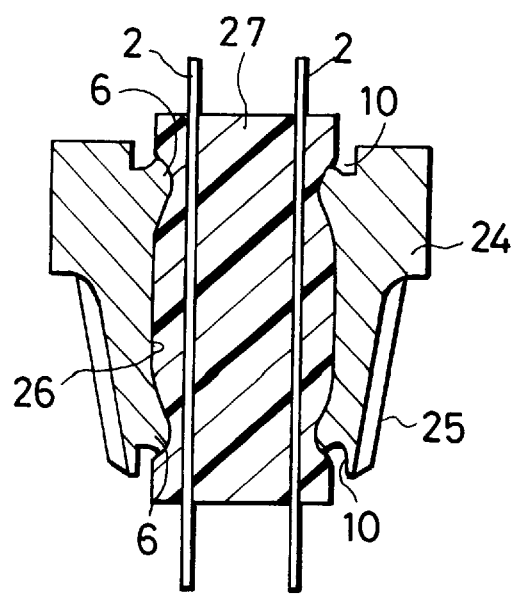
FIG. 15 is a longitudinal cross sectional view of a screw type plug to which a plurality of conductors are attached by being collectively applied with the seal structure of the present invention.

FIG. 15 shows another embodiment of the screw type plug. The screw type plug of this embodiment is arranged such that at least two line-shaped conductors 2 are fixed to a single hole 26 by using the single hole 26 and a single insulator 27 through the application of the aforesaid seal structure. This embodiment has a simple structure and can be made easily.

The seal structure described in the above respective embodiments fixes the conducting member 1 to the hole 5 bored in the metal base 4, the conducting member 1 comprising the conductor 2 as the core member and the synthetic resin insulator 3 as the seal member for covering the conductor 2. However, an object member to be caused to pass through the hole 5 and fixed thereto by the above seal structure is not limited to the conductor 2, as described above. As the object member, a member having predetermined rigidity and a suitable length greater than the thickness of the metal base 4 may be fixed and sealed by being applied to the seal structure, the member including, for example, a metal pipe member for flowing gas, liquid or the like, heat pipe for flowing a heat medium, optical fiber for transferring an optical signal and members similar to them. These members are caused to pass through the aforesaid hole 5 and fixed by the aforesaid seal structure in the state that they are covered with substantially the same synthetic resin material as the aforesaid insulator 3.

A specific example of the metal pipe member for flowing gas or liquid includes a pipe for flowing cooling medium used in a refrigerating machine of a cold storage. The metal base to which the metal pipe member for flowing gas or liquid is a portion of the vessel wall of, for example, a closed vessel in which the gas or liquid is confined. Further, when the member such as a heat pipe, optical fiber or the like is caused to pass through the hole 5 of the metal base 4 and fixed to the hole 5 by the provision of the above seal structure with the hole 5, emphasis must be laid on the seal performance of the synthetic material as the insulator 3 rather than on the insulating property thereof, and thus the synthetic material acts as the seal member.

Further, the metal base 4 is sometimes the vessel wall of the vacuum vessel as described above. At this time, the seal structure provided for the conducting member 1 serves to isolate the reduced pressure region in the vacuum vessel from the atmospheric pressure region outside the vacuum vessel. Further, in this case, the conducting member 1 serves as an electric connecting means for connecting an electric unit disposed inside the vacuum unit to an electric device disposed outside the vacuum vessel.

With respect to the vacuum seal performance of the case in which the seal structure according to the present invention is applied to the aforesaid metal vacuum vessel, a result of the experiment of the gas tightness of a vacuum seal property is as shown below.

(1) Test Method:
   A test was executed by a vacuum surrounding method by using a helium (He) gas.
(2) Result of Test:
   A performance equal to or less than $1 \times 10^{-9}$ atm·cc/sec was obtained.

Therefore, the seal structure according to the present invention can exhibit an excellent vacuum seal performance to the seal structure for, for example, a helium gas in a vacuum device.

Next, intimate contact properties between the hole 5 bored in the metal base 4, the member caused to pass through the hole and fixed therein and the synthetic resin material as the seal member in the above seal structure will be described, respectively. It is preferable that at least one surface of the member to be caused to pass through and the inner surface of the hole 5 be roughly processed. When the metal base 4 is plastically deformed to confine the synthetic resin material as the seal member, the metal base 4 and passing-through member come into contact with the synthetic resin material with a high intimate contact property by the property of the roughly processed surface of the passing-through member and/or the roughly processed inner surface of the hole 5 in addition to the internal pressure of the above synthetic resin (seal member).

As an example for roughly processing the surface of the member to be passed through the hole 5, a very fine irregular portion, for example, is formed on the surface thereof (e.g. by a sand blast). Further, a relatively large irregular portion is formed to the part of the surface of the member which is located in the hole 5, and further annular grooves 31 may be formed, for example, in the number of two to the portion of the passing-through member (core member) located in the hole 5A as shown in FIG. 16.

Figure 16:
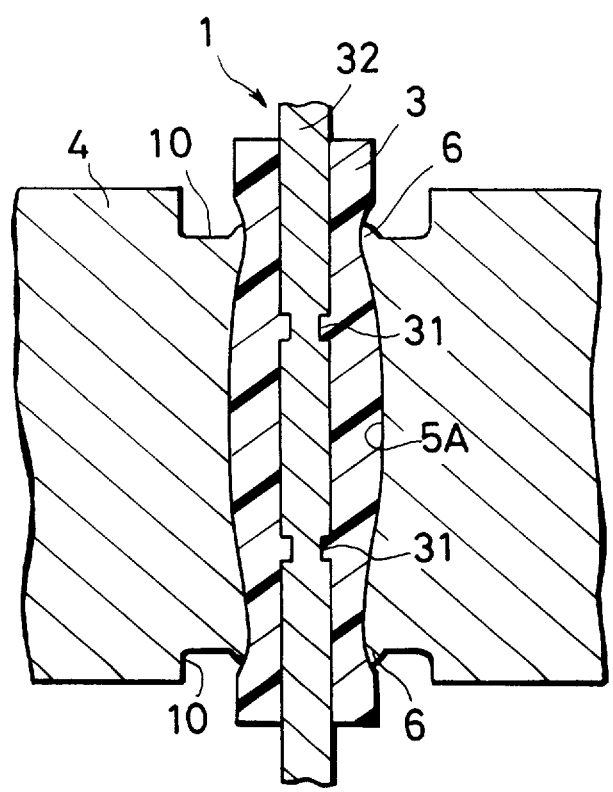
FIG. 16 is a longitudinal cross sectional view of the main portion showing another embodiment of the seal structure according to the present invention.

In the embodiment shown in FIG. 16, when a conductor 32 to which the grooves 31 are previously formed is used and caused to pass through the hole 5 in the state that the conductor 32 is covered with the synthetic resin insulator 3 and the compressing force is applied to the metal base 4 by using the pressure application metal fixtures 8 and 9, as described in the embodiments of FIG. 1, the insulator 3 is confined by the plastic deformation of the metal base 4 and flowed into the annular grooves 31. With this arrangement, the conductor 32 comes into intimate contact with the insulator 3. In this case, an amount of compression (or compressing force) applied by the pressure application metal fixtures must be set by taking the volume of the annular groves 31 into consideration. Further, as another embodiment, the conductor 32 may be previously bonded to the synthetic resin insulator 3 in an intimate contact state at a step before the conductor 32 is caused to pass through the hole of the metal base 4 or at the step where the conductor 32 is disposed in the state that it is caused to pass through the hole.

Figure 17:
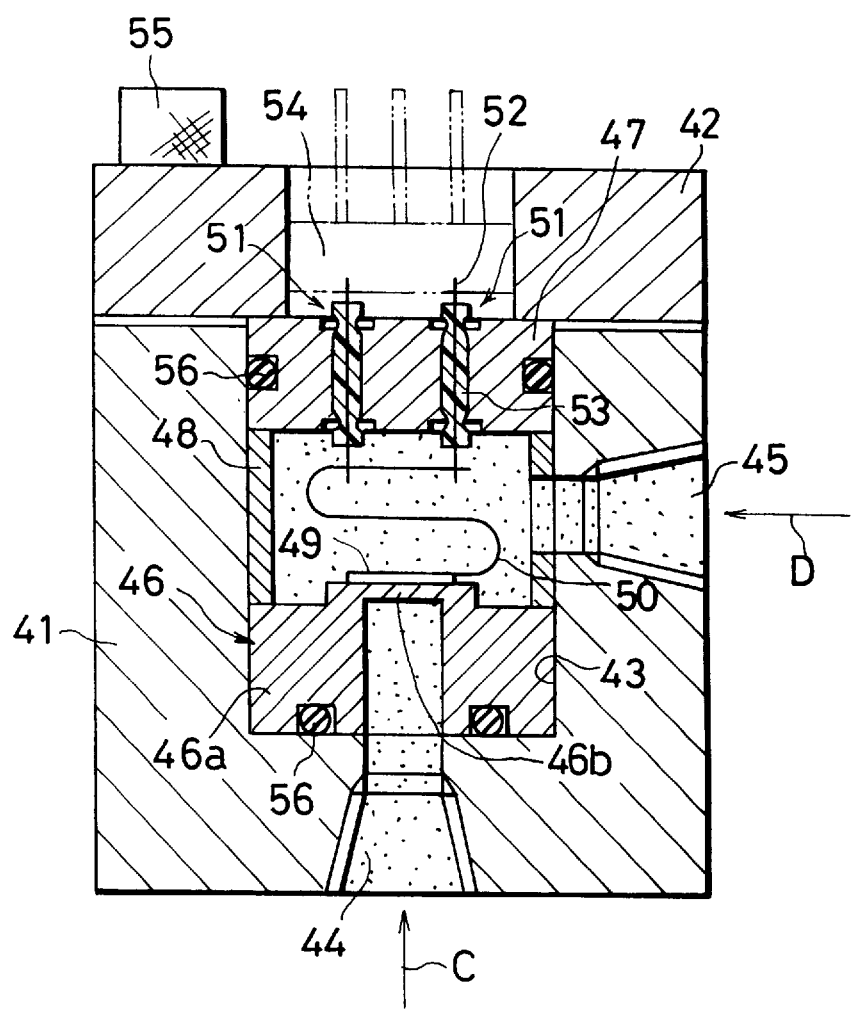
FIG. 17 is a longitudinal cross sectional view of a pressure difference sensor unit disposed in a hydraulic fluid and having the deriving portion of a signal deriving line made by being applied with the seal structure of the present invention.

FIG. 17 shows an example of the application of the aforesaid seal structure to the hole through which the conducting member is caused to pass. This applied example relates to the seal structure of the portion for deriving a signal line from a pressure difference sensor unit assembled in a hydraulic circuit.

In FIG. 17, reference numeral 41 designates a casing and reference numeral 42 designates a casing cover. Although the casing 41 is a portion of the wall of, for example, the metal vessel of a hydraulic unit serving as a main body having a hole for introducing a pressure medium such as a hydraulic fluid or the like, the main body is referred to as the casing here for convenience. The casing 41 has a recessed portion 43 located at the center portion thereof, a first hydraulic fluid introducing path 44 communicating from the lower surface thereof to the recessed portion 43, and a second hydraulic fluid introducing path 45 communicating from the side surface thereof to the recessed portion 43, each formed to the casing 41. The recessed portion 43 of the casing 41 includes a diaphragm body 46 composed of a metal material and disposed on the bottom thereof, a metal base 47 disposed to the upper opening thereof, and a spacer 48 disposed at the intermediate portion thereof.

The diaphragm body 46 is composed of a support unit 46*a* and a diaphragm unit 46*b* which acts as a distorting portion for receiving a different pressure on the front and back surfaces thereof. The metal base 47 acts as a lid for the recessed portion 43, confines the hydraulic fluid introduced into the recessed portion 43 and includes a plurality of conducting members 51 in a fixed state. Each of the conducting members 51 is composed of a line-shaped conductor 52 and an insulator 53. The aforesaid seal structure is formed in such a manner that the conducting members 51 are extended from and fixed in the metal base 47 and the holes through which the conducting members 51 are extended are sealed. A space is provided between the diaphragm body 46 and the metal base 47 by the spacer 48. A pressure difference sensing film 49 for sensing a difference of the pressures applied to the opposite surfaces of the diaphragm unit 46*b* is formed in such a manner that an insulating film is formed on the upper surface of the diaphragm unit 46*b* and strain gauges and wiring films are formed on the insulating film. A signal sensed by and output from the pressure difference sensing film 49 is derived to the outside by the conducting members 51 through a flexible printed circuit (FPC) 50.

A first hydraulic fluid C is supplied to the lower surface of the diaphragm unit 46*b* through the first hydraulic fluid introduction path 44 and a second hydraulic fluid D is supplied to the upper surface thereof through the second hydraulic fluid introduction path 45. Therefore, the upper space of the diaphragm body 46 is filled with the second hydraulic fluid D. The pressure difference sensing film 49 is covered with a protective film and protected from the hydraulic fluid. The lower end of the conductor 52 of the conducting member 51 is connected to the FPC 50 and the upper end of the conductor 52 is connected to an amplifier 54. The casing 41 is integrally connected to the casing cover 42 by a plurality of bolts 55. The metal base 47 is fixed by being compressed by the casing cover 42. Note, reference numeral 56 designates an O ring for seal.

According to the above structure, a pressure difference signal sensed by the pressure difference sensing film 49 is transferred to the conductors 51 of the metal base 47 through the FPC 50 and derived to the amplifier 54 through the conducting members 51. The second hydraulic fluid D is supplied to the space on the lower side of the metal base 47 to produce a high pressure. According to the seal structure used for the mounting holes for the conducting members 51 in the metal base 47, an electric signal can be derived from the pressure difference sensing film 49 which is disposed in the high pressure region in the hydraulic fluid to an atmospheric pressure region where the amplifier 54 is disposed. Even if a high pressure exceeding 350 kgf/cm$^2$ is repeatedly introduced through the second hydraulic fluid introduction path 45 at this time, it has been experimentally confirmed that the seal structure of the mounting portions for the conducting members 51 has a sufficient pressure resisting performance.

Figure 18:
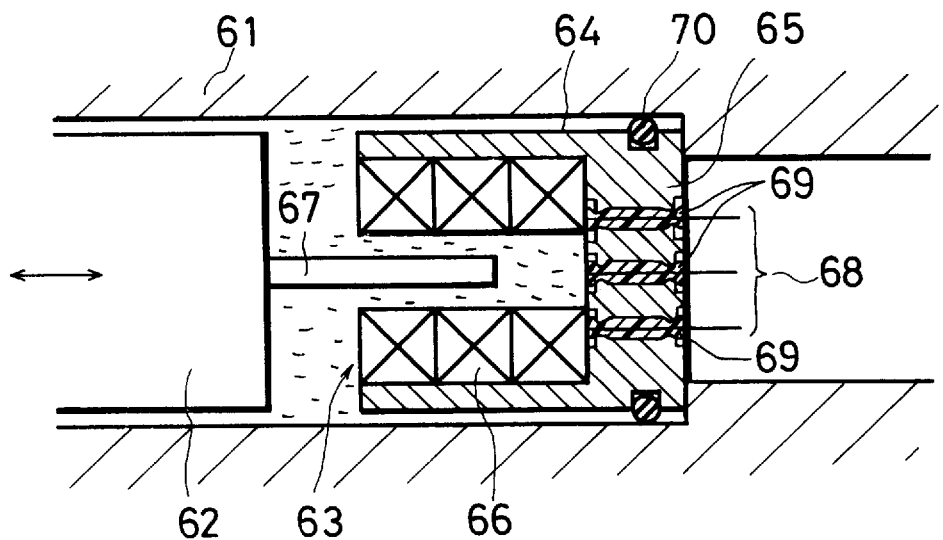
FIG. 18 is a longitudinal cross sectional view of a displacement sensor unit disposed in an operating fluid and having the deriving portion of a signal deriving line made by being applied with the seal structure of the present invention.

FIG. 18 shows another embodiment of the conductor extracting portion making use of the seal structure according to the present invention. This embodiment shows the seal structure of the portion for deriving a signal from a displacement sensor assembled in the interior of a valve unit. In FIG. 18, reference numeral 61 designates a casing having a predetermined space therein. The interior of the space is filled with a hydraulic fluid and further includes a movable member (spool) 62 slidingly disposed therein. The movable member (spool) 62 is moved by the flow-in or flow-out of the hydraulic fluid and thus has a function as a valve. Reference numeral 63 designates a displacement sensor disposed in the hydraulic fluid at an end of the space. The displacement sensor 63 is arranged by making use of the function of a differential transformer. Reference numeral 64 is a cylindrical holder for the displacement sensor and made of a metal material. Further, a closed wall portion 65 is provided at the right end in the Figure of the holder 64. A coil 66 is disposed in the holder 64. A rod-shaped ferrite core 67 is mounted at the right end of the movable member (spool) 62. The ferrite core 67 moves in the space of the coil 66 in accordance with the positional change of the movable coil (spool) 62. When the ferrite core 67 moves in the coil 66, the displacement of the movable member (spool) 62 can be derived as an electric signal.

The coil 66 is held in an excited state in the displacement sensor 63. Therefore, a necessary current is supplied to a coil winding through conductors. Reference numeral 68 in the Figure designates conductors extended from the displacement sensor 63 to the outside. Although it is not strictly shown in the illustrated example, when a plurality of the conductors 68 are extended outside, the aforesaid seal structure of the signal line extracting portion is applied to the wall portion 65 of the holder 64. In FIG. 18, reference numeral 69 designates the aforesaid synthetic resin covering material. Further, an O ring 70 is interposed between the holder 64 and the valve casing 61 to seal the hydraulic fluid around the displacement sensor 63.

A high internal pressure can be sufficiently sealed by employing the seal structure according to the present invention to the above displacement sensor 63.

The seal structure for the member-passing-through hole according to the present invention can be used for the seal structure of a high pressure gas, a similar seal structure in a sensor in which an $N_2$ gas is confined, a similar seal structure in a semiconductor device and the like, in addition to the above embodiments.

Although the conductor 2 is inserted into the hole formed in the tubular insulator 3 in the aforesaid typical embodiments, the conductor 2 may be bonded to the insulator 3 by adhesive. A seal performance can be further improved by this arrangement.

Further, a flexible printed circuit (FPC) may be used in place of the conductor 2. In this case, the FPC as a conductor is covered with the insulator 3 by an injection molding or the like. The FPC covered with the insulator 3 is fixed to the metal base by the aforesaid seal structure.

According to the present invention, there is provided a seal structure by which the core member covered with the synthetic resin seal member having elastic plasticity is caused to pass through the hole bored in the metal partition member and the hole is sealed, wherein a bonded portion is formed to the seal member by restriction and constriction to thereby form the seal structure having a very excellent pressure resistive performance. In particular, when the caulking portion is formed in the vicinity of the openings at the opposite ends of the hole, the seal member is formed substantially to the fusiform shape, whereby seal performance is improved. The seal structure has a simple arrangement and can be made by a simple process at a low cost. As described above, the pressure resistant reliability of a portion for extracting or connecting conductors and the like can be improved by the seal structure according to the present invention and thus an economic efficiency can be improved thereby.

INDUSTRIAL APPLICABILITY

A seal structure having a high pressure resistant performance even against an ultrahigh pressure and capable of stably sealing a hole for a long time can be realized and used as the seal structure for a portion for extracting various kinds of members, the hole being bored in the metal portion of a partition member for isolating the inside region of a pressure vessel, vacuum vessel and closed vessel for accommodating gas and liquid each made of a metal material from the outside thereof, and further the hole being used to cause such a member to pass therethrough as a conductor or conductor pin for transferring an electric signal or electric power, other conductors, a metal pipe member for flowing a fluid, a heat pipe for flowing a heat medium, an optical fiber for transferring an optical signal, and the like.

We claim:

1. A seal structure for a member-passing-through hole of a metal partition member wherein:
   a member for connecting an internal device to an external device is caused to pass through said hole;
   a seal member is disposed between said member and said hole;
   a constricted portion is formed in at least one of two openings at the opposite ends of said hole by forming a plastically deformed portion uniformly swelling from an inner wall surface of said hole by applying a pressure to a circumferential portion of said opening in an axial direction of said hole;
   said member and said seal member are uniformly compressed from the circumferences thereof and said seal member is confined in said hole by said constricted portion to thereby seal said hole; and
   wherein a deformation restricting portion is disposed on an inner circumferential portion of the opening at a first end of said hole to prevent said seal member from swelling to the outside of said hole and deforming, and said constricted portion is formed by producing said plastic deformation by the application of said pressure to the circumferential portion of the opening at the other end of said hole to thereby deform said seal member and confine the seal member in said hole so that said member is fixed to said hole and said hole is sealed by internal pressure produced by said confinement.

2. A seal structure for a member-passing-through hole of a metal partition member comprising:
   an electric conducting member for connecting an internal electric device to an external electric device which passes through said hole in said metal partition member;
   a seal member having an electric insulating property disposed between said electrical conducting member and said hole;
   a constricted portion formed in at least one of two openings at the opposite ends of said hole by forming a plastically deformed portion uniformly swelling from an inner wall surface of said hole by applying a pressure to a circumferential portion of said opening in an axial direction of said hole;
   said electrical conducting member and said seal member being uniformly compressed around the circumferences thereof and said seal member being confined in said hole by said constricted portion to thereby seal said hole; and
   wherein a deformation restricting portion is disposed on an inner circumferential portion of the opening at a first end of said hole to prevent said seal member from swelling to the outside of said hole and deforming, and said constricted portion is formed by producing said plastic deformation by the application of said pressure to the circumferential portion of the opening at the other end of said hole to thereby deform said seal member and confine said seal member in said hole so that said electrical conducting member is fixed to said hole and said hole is sealed by internal pressure produced by said confinement.

3. A seal structure for a member-passing-through hole formed in a metal partition member for causing a member having an axial length greater than the thickness of said metal partition member and rigidity to pass through said hole and sealing the hole by a seal member, wherein:
   said member is disposed through said seal member in said hole;
   a constricted portion is formed in at least one of two openings at the opposite ends of said hole in such a manner that plastic deformation in the form of substantially uniform swelling from an inside wall surface of said hole over the entire circumference thereof is produced in the vicinity of the at least one opening of said metal partition member by applying a pressure to a circumferential portion of said opening in the axial direction of said hole; and
   said member and said seal member are uniformly compressed from the entire circumference thereof by said constricted portion and said seal member is confined in said hole in a pressure state of a degree for preventing the aged yield deterioration of said seal member so that said member is fixed to said hole and said hole is sealed by internal pressure produced by the confinement; and wherein a deformation restricting portion is disposed on an inner circumferential portion of the opening at a first end of said hole to prevent said seal member from swelling to the outside of said hole and deforming, and said constricted portion is formed by producing said plastic deformation by the application of said pressure to the circumferential portion of the opening at the other end of said hole to thereby deform said seal member and confine the same in said hole in a pressurized state so that said member is fixed to said hole and said hole is sealed by internal pressure produced by said confinement.

4. A seal structure for a member-passing-through hole according to claim 3, wherein said deformation restricting portion is formed to be a stepped-hole portion by reducing the diameter of the opening at said first end of said hole.

5. A seal structure for a member-passing-through hole according to claim 4, wherein the inner surface of said stepped-hole portion is tapered.

6. A seal structure for a member-passing-through a round hole formed in a metal partition member, said metal partition member isolating an inside region from an outside region and defining the inside region to be tightly closed, and said seal structure being used for sealing the hole formed in said metal partition member and through which a member passes from the inside region to the outside region, said member having an axial length greater than the thickness of said metal partition member and rigidity, said seal structure further being used for fixing said member in said hole, comprising:

a seal member made of a material having elastic plasticity, which has a circular shape having an outside diameter substantially equal to an inside diameter of said hole and having an axial length equal to or greater than the thickness of said metal partition member and being arranged to surround said member in said hole, wherein;

said metal partition member is subjected to a pressure difference between said inside and outside regions;

said member is disposed through said seal member in said hole;

at least one constricted portion is formed in at least one of two openings at the opposite ends of said hole in such a manner that plastic deformation in the form of substantially uniform swelling from an inside wall surface of said hole over the entire circumference thereof is produced in the vicinity of the at least one opening of said metal partition member by applying a pressure to a circumferential portion of said at least one opening in an axial direction of said hole; and said member and said seal member are uniformly compressed around the entire circumferences thereof by said at least one constricted portion and said seal member is confined in said hole in a pressure state of a degree for preventing the aged yield deterioration of said seal member so that said member is fixed to said hole and said hole is sealed by internal pressure produced by the confinement.

7. A seal structure for a member-passing-through round hole according to claim 6, which comprises two constricted portions, one formed in each of the two openings at the opposite ends of said hole by producing the plastic deformation by the application of said pressure to the circumferential portion of the openings at the opposite ends of said hole to thereby substantially deform said seal member to a barrel shape and confine the same in said hole in said pressure state so that said member is fixed to said hole and said hole is sealed by internal pressure produced by said confinement.

8. A seal structure for a member-passing-through round hole according to claim 6, wherein said member is an electric conducting member for transferring an electric signal or electric power and said seal member is an electric insulator for covering said electric conducting member.

9. A seal structure for a member-passing-through round hole according to claim 8, wherein said electric conducting member is a line-shaped member or pin-shaped member.

10. A seal structure for a member-passing-through round hole according to claim 6, wherein said member is a pipe member for transferring gas or liquid.

11. A seal structure for a member-passing-through round hole according to claim 10, wherein said pipe member is a heat pipe for transferring a heat medium.

12. A seal structure for a member-passing-through round hole according to claim 6, wherein said member is an optical fiber for transferring an optical signal.

13. A seal structure for a member-passing-through round hole according to claim 6, wherein said seal member is formed by using a synthetic resin.

14. A seal structure for a member-passing-through round hole according to claim 13, wherein said synthetic resin is any one of polyphenylenesulfide (PPS), polytherimide (PEI), polyetherketone (PEEK), and polyimide (PI).

15. A seal structure for a member-passing-through round hole according to claim 1, wherein said metal partition member is a wall portion of a vessel whose inside region and outside region have a pressure difference.

16. A seal structure for a member-passing-through round hole according to claim 15, wherein said vessel is a pressure vessel whose inside region is in a high pressure state and whose outside region is in an atmospheric pressure state.

17. A seal structure for a member-passing-through round hole according to claim 15, wherein said vessel is a vacuum vessel whose inside region is in a vacuum state and whose outside region is in an atmospheric pressure state.

18. A seal structure for a member-passing-through round hole according to claim 16, wherein said pressure vessel is a portion of a hydraulic circuit mechanism having a high pressure operating fluid therein, and said member is an electric signal line extended to transmit a signal, which is sensed by an electric sensor unit disposed in the interior of said pressure vessel for sensing information regarding a hydraulic pressure, to the outside of said vessel.

19. A seal structure for a member-passing-through round hole according to claim 16, wherein said metal pressure vessel is a vessel forming a valve casing having a high pressure operating fluid therein and a displacement sensor located in the operating fluid, and said member is an electric signal line extended to transmit a signal sensed by said displacement sensor to the outside of said vessel.

20. A seal structure for a member-passing-through round hole (bored in a metal partition member) according to claim 6, wherein said metal partition member is a wall portion of a vessel whose inside region and outside region have different chemical contents.

21. A seal structure for a member-passing-through round hole according to claim 6, wherein said metal partition member is a seal plug mounted on a closed vessel.

22. A seal structure for a member-passing-through round hole according to claim 21, wherein said seal plug has a screw type structure and is detachably mounted on said closed vessel.

23. A seal structure for a member-passing-through round hole according to claim 21, wherein said seal plug is provided with a plurality of members passing there through.

24. A seal structure for a member-passing-through round hole according to claim 23, wherein said plurality of members are sealed to respective corresponding holes by respective seal members and individually sealed by said respective seal members.

25. A seal structure for a member-passing-through round hole according to claim 23, wherein said plurality of members are provided by being sealed to said hole by said seal member and collectively sealed by said seal member.

26. A seal structure for a member-passing-through round hole according to claim 6, wherein at least any one of a surface of said member and the inner circumferential surface of said hole is roughened.

27. A seal structure for a member-passing-through round hole according to claim 1, wherein an irregular portion is formed on a surface of a portion of said member which is located in said hole.

28. A seal structure for a member-passing-through round hole according to claim 27, wherein at least one annular groove is formed in a portion of said member which is located in said hole.

29. A seal structure for a member-passing-through round hole of a metal partition member, said metal partition member isolating an inside region from an outside region and defining the inside region to be tightly closed, comprising:

a member for connecting an internal device in the inside region to an external device in the outside region which is caused to pass through said hole bored in said metal partition member;

a seal member disposed between said member and said hole, which is made of a material having elastic plasticity and has a circular shape having an outside diameter substantially equal to an inside diameter of said hole;

a constricted portion formed in at least one of two openings at the opposite ends of said hole by forming a plastically deformed portion uniformly swelling from an inner wall surface of said hole by applying a pressure to a circumferential portion of said at least one opening in an axial direction of said hole; and said member and said seal member being uniformly compressed around the circumferences thereof and said seal member being confined in said hole by said constricted portion to thereby seal said hole; and wherein said seal structure is used for sealing said hole and fixing said member to said hole; and said metal partition member is subjected to a pressure difference between said inside and outside regions.

30. A seal structure for a member-passing-through round hole of a metal partition member according to claim 29, wherein said seal member is deformed to substantially a barrel shape and confined in said hole by producing plastic deformation by applying said pressure to the circumferential portion of both of the two openings at the opposite ends of said hole so that said member is fixed to said hole and said hole is sealed by the internal pressure produced by said confinement.

31. A seal structure for a member-passing-through round hole of a metal partition member according to claim 29, wherein said metal partition member is a wall portion of a vessel whose inside region and outside region have a pressure difference.

32. A seal structure for a member-passing-through round hole of a metal partition member according to claim 29, wherein said metal partition member is a wall portion of a vessel whose inside region and outside region have difference chemical contents.

33. A seal structure for a member-passing-through round hole of a metal partition member according to claim 29, wherein said seal member is formed by using a synthetic resin.

34. A seal structure for a member-passing-through round hole of a metal partition member according to claim 33, wherein said synthetic resin is any one of polyphenylenesulfide (PPS), polytherimide (PEI), polyetherketone (PEEK), and polyimide (PI).

35. A seal structure for a member-passing-through round hole of a metal partition member, said metal partition member isolating an inside region from an outside region and defining the inside region to be tightly closed, comprising:

an electric conducting member for connecting an internal electric device in the inside region to an external electric device in the outside region which is caused to pass through said round hole in said metal partition member;

a seal member having an electric insulating property disposed between said member and said round hole, and having a circular shape having an outside diameter equal to an inside diameter of said round hole;

a constricted portion formed in at least one of two openings at the opposite ends of said round hole by forming a plastically deformed portion uniformly swelling from an inner wall surface of said round hole by applying a pressure to a circumferential portion of said at least one opening in an axial direction of said round hole; and said member and said seal member being uniformly compressed around the circumferences thereof and said seal member being confined in said round hole by said constricted portion thereby seal said round hole; and wherein said seal structure is used for sealing said round hole and fixing said member to said hole, and said metal partition member is subjected to a pressure difference between said inside and outside regions.

36. A seal structure for a member-passing-through round hole of a metal partition member according to claim 35, which comprises two constricted portions, one formed in at least one of the two openings at the opposite ends of said hole and said seal member is deformed to substantially a barrel shape and confined in said hole by producing said plastic deformation by applying said pressure to the circumferential portion of the openings at the opposite ends of said hole so that said member is fixed to said hole and said hole is sealed by internal pressure produced by said confinement.

37. A seal structure for a member-passing-through round hole of a metal partition member according to claim 35, wherein said member is a line-shaped member or pin-shaped member.

38. A seal structure for a member-passing-through round hole of a metal partition member according to claim 35, wherein said seal member is formed by using a synthetic resin.

39. A seal structure for a member-passing-through round hole of a metal partition member according to claim 38, wherein said synthetic resin is any one of polyphenylenesulfide (PPS), polytherimide (PEI), polyetherketone (PEEK), and polyimide (PI).

40. A seal structure for a member-passing-through round hole of a metal partition member according to claim 35, wherein said metal partition member is a wall portion of a vessel whose inside region and outside region have a pressure difference.

* * * * *